April 22, 1958  M. R. JENSEN  2,831,496
VALVE CONTROL APPARATUS
Filed April 18, 1955
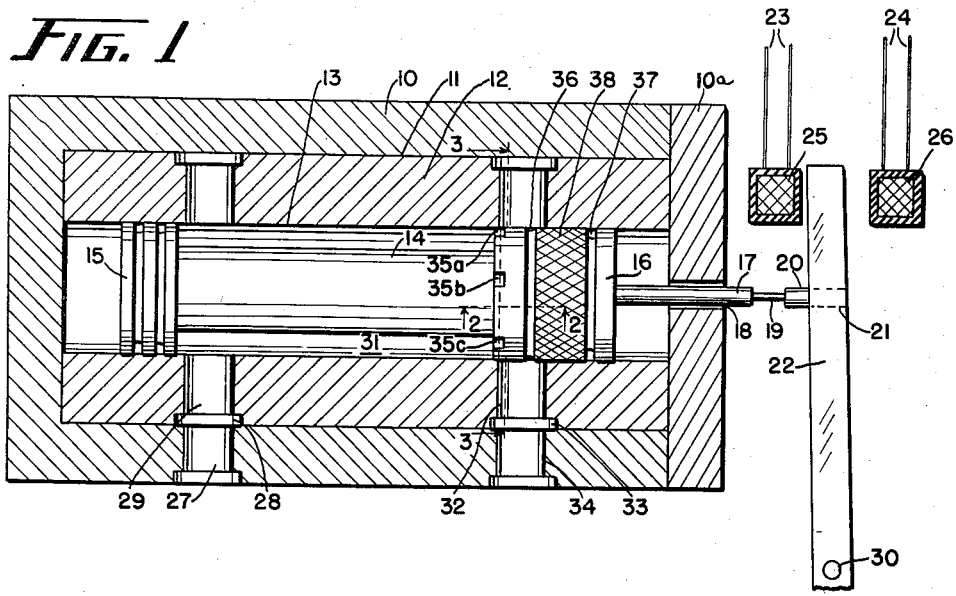
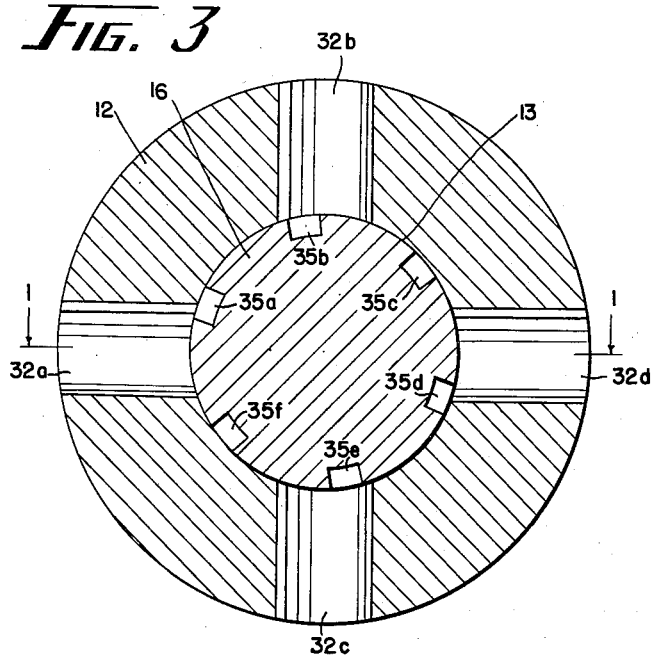
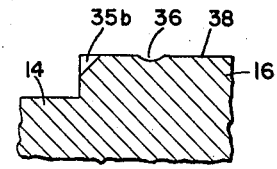
INVENTOR.
MERLIN R. JENSEN
BY
ATTORNEY

United States Patent Office 2,831,496
Patented Apr. 22, 1958

2,831,496

VALVE CONTROL APPARATUS

Merlin R. Jensen, Minneapolis, Minn., assignor to Minneapolis-Honeywell Regulator Company, Minneapolis, Minn., a corporation of Delaware Application April 18, 1955, Serial No. 501,987

5 Claims. (Cl. 137—331)

This invention relates to control valves and like devices, and, more specifically, to means for the reduction of inherent static friction within such devices.

As fluid pressures used in hydraulic applications and systems have increased, and as the size of valves, valve actuators, etc. have decreased, problems have arisen in the valve control field. Thus, silting and other forms of valve jamming have made their presence felt. To overcome these problems, various expedients have been tried, including "dither," or relative rotation of valve components. Such a procedure as dither does appreciably reduce static friction, however, the means used to accomplish the result have required either a good deal of neutral leakage and/or the addition, to the valve device, of an auxiliary mechanism. In many applications, such as aviation hydraulic systems, neutral leakage must be held to a minimum to insure that the pressure fluid supply is sufficient to fulfill the need of the hydraulic system under peak demand conditions. Further, many applications cannot tolerate the space and weight requirement and cost of a mechanical dithering mechanism.

It is, therefore, an object of this invention to provide a valve device that can develop rotational dither without auxiliary mechanical mechanisms.

Another object of this invention is to provide a dithering device, without auxiliary mechanical mechanisms, which has very low neutral leakage.

A further object of this invention is to provide a device that will provide a substantially uniform fluid film between mating valve members.

A still further object of this invention is to provide a device that appreciably reduces inherent static friction therein without radically departing from or adding to the normal valve design, thus insuring low cost.

These and other objects will become apparent upon reading the following specification and appended claims in conjunction with the accompanying drawing, in which:

Figure 1 is a cross sectional view of a valve embodying the invention;

Figure 2 is an enlarged cross sectional view taken along lines 2—2 of Figure 1 showing details of the valve spool;

Figure 3 is an enlarged cross sectional view along lines 3—3 of Figure 1 showing the location of the valve spool in relation to the valve sleeve.

The present invention reduces static friction considerably, and yet eliminates the need for any auxiliary dithering mechanism, and holds neutral leakage to a bare minimum. This is accomplished by utilizing the fluid pressure within the valve or like device to reduce the static friction between the mating valve members therein, by causing the fluid to impart a constant oscillatory or rotational dither motion to one of the components, and by providing a myriad of fluid paths between mating surfaces to insure a substantially even thickness of fluid film between the mating surfaces.

In Figure 1, a valve body 10 has within its bore 11 a valve sleeve 12 which has a bore 13. Disposed within the bore 13 is a valve spool 14 with valve lands 15 and 16. Valve stem 17, which is rigidly connected to the valve 14, extends beyond the valve body 10, through an opening 18 in end plate 10a, and is connected to a spring member 19 in such a manner that spring member 19 cannot rotate coaxially relative to valve stem 17. Rod 20 connects with spring member 19, and likewise is connected in such a manner as to eliminate the possibility of relative coaxial rotation therebetween, and further, is firmly attached in opening 21 of armature 22 to guard against rotation of rod 20 with respect to the opening 21.

Leads 23 and 24 provide the means for the impression of a voltage differential from a control source, not shown, upon the coils 25 and 26, respectively, to cause movement of armature 22 about its pivot 30 and thereby axial movement of valve 14.

Supply pressure fluid from a pressure source, not shown, enters the valve cavity 31 through port 27, annular opening 28, and port 29, and modulated pressure fluid leaves the valve cavity 31 through ports 32a, 32b, 32d, and 32e, annular opening 33, and port 34, and passes to a controlled device, not shown. Valve land 16 has a series of evenly spaced notches 35a, 35b, 35c, 35d, 35e, 35f on the end portion thereof exposed to pressure fluid. Upon valve land 16 and separated by valve grooves 36 and 37, periphery portion 38 has thereon a series of closely spaced intersecting grooves of minute depth through which fluid may pass.

The notch 35b is shown in enlarged cross section in Figure 2. The notches are formed by removal of a portion of the periphery and a portion of the end face of valve land 16. As shown, the portion removed is in the form of a triangular prism, however, the removed portions may be in other forms, such as cubic or rectangular prisms.

The valve is so designed and "rigged" that the notches that are in partial communication with ports 32a and 32d, such as 35a and 35d, as shown in Figure 3, are in relative positions therewith. Thus, upon clockwise rotation, as viewed in Figure 3, notch 35d crosses the trailing surface or side edge of port 32d, and notch 35a crosses the trailing surface or side edge of port 32a. Further, the design of the valve must be such that upon this rotation of the valve land 16 in a clockwise direction, which causes notches 35a and 35d to be closed and covered by the bore 13 of the valve sleeve 12, the remainder of the notches shall remain fully covered, such as 35c and 35f, or fully within the opening of the port, such as 35b and 35e. The device would work using only one notch straddling a port. Likewise numerous notches could be used. The exact number employed is dependent upon the particular valve design and the torque required thereby to cause sufficient rotation to maintain the dither. The extra notches 35b, c, e, f are provided to allow easier "rigging" of the valve in assembly.

Having set forth the elements of the device, a description of the operation will now be given: The valve as shown is in a closed position. Upon the introduction of pressure fluid into valve cavity 31 from pressure source, not shown through port 27, annular opening 28 and port 29, such fluid naturally seeks a path of escape to an area of lower pressure. This path of escape is afforded by notches 35a and 35d, as they extend partially axially and partially angularly within ports 32a and 32d. The amount of fluid that does escape to ports 32a and 32d is negligible due to the small orifices formed by the notches 35a and 35d and the ports 32a and 32d, respectively. However, the passage of fluid therethrough does produce a phenomenon. That is, the valve spool 14 is caused to rotate, in this case, in a clockwise direction about its longitudinal axis, thereby tending to close off notches 35a and 35d from ports 32a and 32d, respectively. The rotation of the valve spool 14 results when fluid passes thru the orifices, formed by the notches 35a and 53d and the ports 32a and 32d, respectively, from a relatively high pressure area to a relatively low pressure area. The exact reason why the passage of fluid thru the orifices results in rotation of the valve spool 14 is not known, however, it may be due to fluid impingement on the side surfaces of the notches as the fluid passes thru the orifices, which impingement sets up forces tending to cause rotation of the valve spool 14, or again, it may be due to Bernoulli flow forces which are set up when fluid passes thru an orifice, which forces tend to close the orifice thereby resulting in rotation of the valve spool 14. The rotational energy is transposed to spring member 19 wherein it is stored as potential energy. Upon the closure of the orifices formed by the notches and the ports, fluid passage of course ceases. As the orifice closes there is no further rotational force acting on the spool as a consequence of fluid flow. However, the potential energy stored in the spring member 19 causes the valve spool 14 to be snapped back to a position substantially similar to its original position. The notches 35a and 35d upon being repositioned by the spring once more pass pressure fluid therethrough to ports 32a and 32d, and the cycle described above is repeated. Here it is to be noted, that the spring member 19 has to be designed to alow sufficient rotational movement of the valve spool 14 by pressure fluid, so as to permit notches 35a and 35d to be closed or covered, and yet be sturdy enough not to cause instability by overshooting the ports when rotated by flow forces or returned by the potential energy of the spring member.

This rotational oscillation takes place whether the valve 14 is in the closed position as shown, or whether the valve 14 is placed in an open position by the action of the armature 22 under the direction of the coils 25 and 26. This is because the fluid seeking escape still acts on the notches of the valve spool and places forces thereon that cause the valve spool to be rotated regardless of its longitudinal position. So it can be seen that a constant oscillation takes place when the valve is exposed to pressure fluid. This oscillation reduces static friction, and thus less energy is required to actuate the valve in the axial direction.

Further friction reduction is accomplished by the utilization of pressure equalization across successive transverse sections of a portion of a valve land. Thus, the intersection of the minute depth grooves on valve land portion 38 provide very small individual land areas. This causes the pressure differential across any one small land in the same vertical plane, brought about by the pressure fluid introduced from the supply pressure source across the notched area of the land or from the modulated pressure area across the groove 36, to be negligible when contrasted with a conventional valve land having an unbroken surface or a grooved land such as valve land 15, as the fluid passing over and around such minute lands is constantly being pressure equalized in the groove due to their intercommunication caused by their successive intersections. This arrangement provides a substantially uniform thickness of fluid film about the periphery of the valve land portion 38, and thus eliminates a cause of valve jamming, that is, metal-to-metal contact, which can be caused in conventional pressure valves due to the unequal peripheral pressures at any transverse axial plane set up due to the lack of positive peripheral fluid communication at such plane, which in turn can be due to the lack of concentricity between the mating valve members.

As it is obvious that there can be other modifications of the foregoing, my invention should be determined by what is claimed.

I claim:

1. In combination, a valve having a valve sleeve and a valve spool therein combining to provide a pressure chamber, said valve sleeve having a radial port, said valve spool having a valve land for porting pressure fluid from said chamber to said radial port, said valve land covering said radial port when in a closed position and having a notch formed in the periphery of an end portion of said land which is so located that said notch is in straddling relation with a side edge of said port so that when said end portion is exposed to pressure fluid said notch tends to be rotated out of its straddling relationship with the edge of said port due to fluid flow thru said notch from said pressure chamber to said radial port, an actuating member for said valve restrained against rotation about the axis of said valve spool, and a spring member interposed between and connecting said valve spool and said actuating member normally positioning said valve spool with said notch in said straddling relation and for restraining the rotational movement of said spool and for storing the energy of rotation of said valve spool to thereby cause a rotation of said valve spool in the opposite direction upon said notch being rotated out of straddling relation with the edge of said radial port.

2. In valve apparatus comprising in combination, a valve body having a cylindrical opening therein and a port transverse to said opening, a valve member including a cylindrical portion with a notch formed in the periphery of an end portion thereof, said valve member being disposed within said valve body in such a manner as to define a pressure chamber to which said notch is exposed, said notch being located in straddling relation to a side edge of said port, said valve member and its notch tending to rotate away from said straddling relation in response to fluid flow therethrough from said pressure chamber to said port, a member restrained from rotation about the axis of said valve member, and a resilient member connecting said valve member and said restrained member for storing energy during rotation of the valve member due to said fluid flow and to cause a return movement of said valve member upon said notch rotating out of its straddling relation with the edge of said port and interrupting said fluid flow therethrough.

3. In valve apparatus comprising in combination, a first valve member having a second valve member disposed therein for angular and longitudinal movement relative thereto, said first and second valve members combining to provide a first pressure chamber, said first valve member containing a second pressure chamber having a side edge portion, the other of said valve members having a notch formed in the periphery thereof, said notch being in fluid communication with said first pressure chamber and so located with respect to the side edge portion of said second pressure chamber that said notch is normally partly in and partly out of registration with said edge of said second pressure chamber so that there is a tendency for said second valve member to rotate said notch out of registry with said second chamber in response to fluid flow through said notch from the chamber of higher pressure to the chamber of lower pressure, and an energy storing means connected to the second valve member for storing the energy of angular movement and to cause an angular movement in the opposite direction as said notch moves out of registry with said second pressure chamber.

4. A device for the reduction of inherent static friction between two mating members comprising; a first member having a cylindrical first opening and a second opening transverse to and communicating with said cylindrical opening, said second opening having a side edge portion; a second member having a cylindrical portion disposed within said cylindrical opening for longitudinal movement and for angular movement about its longitudinal axis, said first and second members combining to include a pressure chamber, said cylindrical portion having an indented portion in the periphery thereof exposed to said pressure chamber and normally located in straddling relation to said side edge portion of said second opening so that when pressure fluid is introduced into said device a path of fluid flow is established between said pressure chamber, the indented portion of said second member, and said second opening tending to cause angular movement of said second member; and energy storing means having a portion thereof connected to said second member to store energy developed during angular movement of said second member to cause a restoring rotative movement of said second member upon said path of fluid flow between the pressure chamber, the indented portion of said second member, and said second opening being interrupted by the rotation of the indented portion out of said straddling relation with the edge of said second opening.

5. A device for the reduction of inherent static friction between two mating members comprising: a first member having a cylindrical opening and an opening transverse to and communicating with said cylindrical opening, said transverse opening having a side edge, a second member having a cylindrical portion disposed within said cylindrical opening and capable of angular movement about its longitudinal axis and relative to said first member, said first and second members combining to form a pressure chamber; said cylindrical portion having an indented portion in the periphery thereof exposed to said pressure chamber and normally straddling said edge of said transverse opening such that when pressure fluid is introduced into said device a path of fluid flow is established between said pressure chamber, the indented portion of said second member, and said transverse opening tending to cause angular movement of said second member; and energy storing means having a portion thereof connected to said second member to store the energy caused by said angular movement of said second member to cause a restoring rotative force to said second member upon said path of fluid flow between said pressure chamber, the indented portion of said second member, and said transverse opening being interrupted by the rotation of the indented portion past the edge of said transverse opening.

References Cited in the file of this patent
UNITED STATES PATENTS

| | | |
|---|---|---|
| 1,877,530 | Read | Sept. 13, 1932 |
| 2,394,343 | Vorech | Feb. 5, 1946 |